United States Patent Office 3,426,515
Patented Feb. 11, 1969

3,426,515
CABBAGE HARVESTER
Emanuel F. Boyer, 4826 Oak Orchard Road,
Albion, N.Y. 14411
Filed Sept. 7, 1965, Ser. No. 485,346
U.S. Cl. 56—327     2 Claims
Int. Cl. A01d 45/26, 23/06

ABSTRACT OF THE DISCLOSURE

The cabbage harvester disclosed comprises a wheeled carriage, on which is mounted a frame that is inclined downwardly from rear to front nearly to ground level. Mounted on the frame are two spaced conveyor belts which travel upwardly from front to rear but whose upper reaches lie in downwardly converging planes. Mounted in front of the conveyors below the forward end of the frame are two spaced pneumatic-tired wheels which are coplanar and driven in opposite directions. As the vehicle moves over a row of cabbages, the wheels engage under the heads of the cabbages at opposite sides thereof to uproot the cabbages and deliver them onto the conveyor belts which carry them to a knife that severs the heads from the stalks.

---

This invention relates to a produce harvester, and more particularly to an improved cabbage harvesting machine of the type disclosed in my U.S. Patent No. 3,194,318.

In the machine disclosed in this patent, a pair of spaced, parallel conveyors are supported intermediate their ends upon the axle of a two-wheeled, tractor-drawn trailer. In use, the conveyors are inclined to the horizontal, so that they project at their forward ends downwardly and forwardly of the trailer toward ground level. Mounted in front of the forward ends of the conveyors is a rigid, bifurcated fork or scoop, which is adapted to pass beneath and uproot cabbages as the trailer is drawn over a row of cabbage plants. The forward motion of the trailer urges the uprooted cabbages rearwardly of the scoop, and onto the conveyors. The conveyors then transport the plants upwardly and rearwardly on the frame, with the cabbage stems projecting downwardly between the conveyors and into the path of a rotating blade, which severs the stem from the cabbages.

The primary object of this invention is to provide a produce harvesting machine of the type described, which has improved means for uprooting cabbages as the machine is drawn over a row of cabbage plants.

Another object of this invention is to provide means of the character described which will be very efficient in operation, reasonable in cost and have a practical life.

Other objects of the invention will be apparent hereinafter from the specification and from the recital of the appended claims, particularly when read in conjunction with the accompanying drawings.

Figure 1:
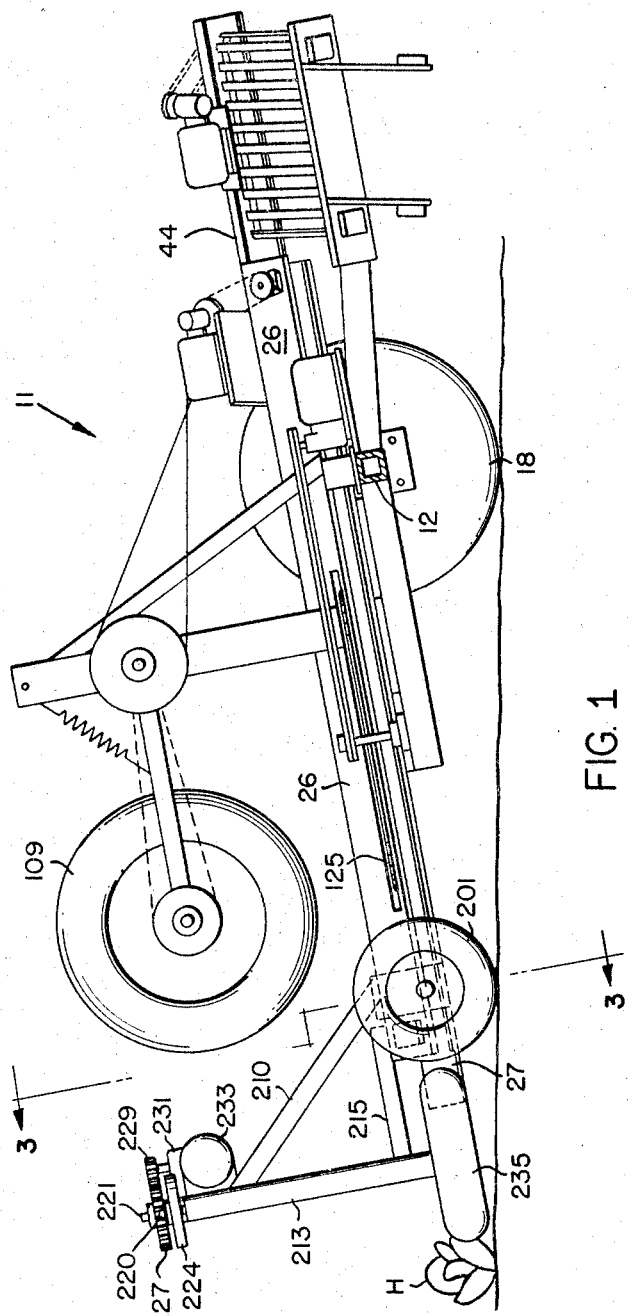
FIG. 1 is a fragmentary side elevational view of a cabbage harvesting machine made in accordance with one embodiment of this invention, parts of the machine being broken away.

Referring now to the drawings by numerals of reference, the harvesting machine 11 comprises an axle 12 (FIG. 1), opposite ends of which are supported on spaced wheels 18, only one of which is illustrated in FIG. 1. Mounted on the chassis or frame of the machine 11 are two, spaced, endless conveyor belts 35 and 53. Each comprises two parallel endless chains and a plurality of spaced slats, which are parallel to one another and are secured to the chains transversely thereof. These belts are similar to the belts 35, 53 disclosed in my above-mentioned Patent No. 3,194,318.

Figure 3:
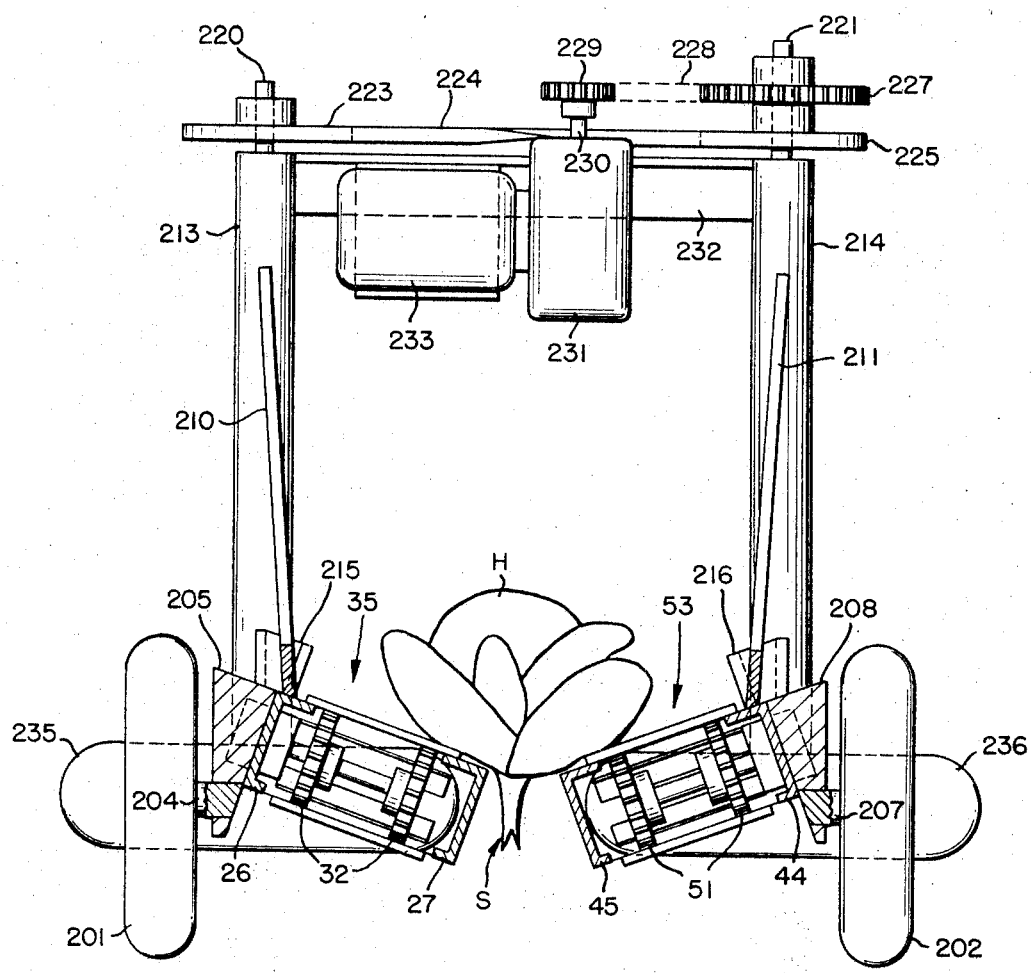
FIG. 3 is an enlarged sectional view taken along the line 3—3 in FIG. 1 looking in the direction of the arrows.

Each belt is mounted to travel over two pairs of longitudinally-spaced sprockets. The front pair of sprockets 32 (FIG. 3), which drive belt 35, are supported between a pair of spaced, parallel channel irons 26 and 27, which are rigidly connected to one another; and the front pair of sprockets 51 (FIG. 3), which drive the belt 53, are supported between a further pair of channel irons 44 and 45, which are also rigidly connected to one another. The two pairs of channel irons 26 and 27, and 44 and 45, respectively, are in turn supported intermediate their ends on the axle 12 so that the upper reaches of the belts 35 and 53 are inclined downwardly toward one another (FIG. 3), as well as being inclined downwardly from rear to front, as illustrated in FIG. 1.

At their forward ends the channel irons 26, 27 and 44, 45 are supported on wheels 201 and 202. Wheel 201 is mounted to rotate upon a stub shaft 204, which is secured to and projects from a metal bracket 205 that is secured to the outer face of the channel iron 26. Wheel 202 is monted to rotate coaxially of wheel 201 on a further stub shaft 207, which is fixed to and which projects from a bracket 208 that is secured to the outer face of the channel iron 44.

Fixed at their rear ends to the front faces of the channel irons 26 and 44, and extending diagonally upwardly and forwardly beyond the front ends of the channel irons, are two, rigid, metal straps 210 and 211. Welded intermediate their ends to the upper ends of the straps 210 and 211, and projecting downwardly in front of the forward ends of the conveyors 35 and 53, respectively, at an angle inclined slightly to the vertical are two, spaced parallel sleeves 213 and 214. Adjacent their lower ends the sleeves 213 and 214 are attached by rigid struts 215 and 216, respectively, (FIG. 3) to the forward ends of the channel irons 26 and 44, respectively.

Journaled in the sleeves 213 and 214, respectively, and projecting beyond opposite ends of the sleeves are shafts 220 and 221, respectively. A pulley 223 is secured to the upper end of the shaft 220, and is connected by a crossed belt 224 to a sheave 225 (FIG. 3), which is secured to the shaft 221 adjacent the upper end thereof. A sprocket wheel 227 is secured to shaft 221 above the wheel 225, and is connected by a chain 228 to a sprocket wheel 229, which is secured to the output shaft 230 of a speed reduction unit 231. Unit 231 is carried by a plate 232, which extends between the upper ends of the sleeves 213 and 214. The speed reduction unit 231 is driven by an electric motor 233 mounted on plate 232.

Mounted on the lower ends of shafts 220 and 221 are inflatable tires 235 and 236, which rotate in coplanar relation. They are spaced apart to straddle a row of cabbages, and engage under the heads thereof to uproot the plants as the harvesting machine travels down the row.

The remainder of the harvesting machine 11 is substantially identical to the machine disclosed in my above-noted Patent No. 3,194,318, and will therefore not be described in detail herein.

Figure 2:
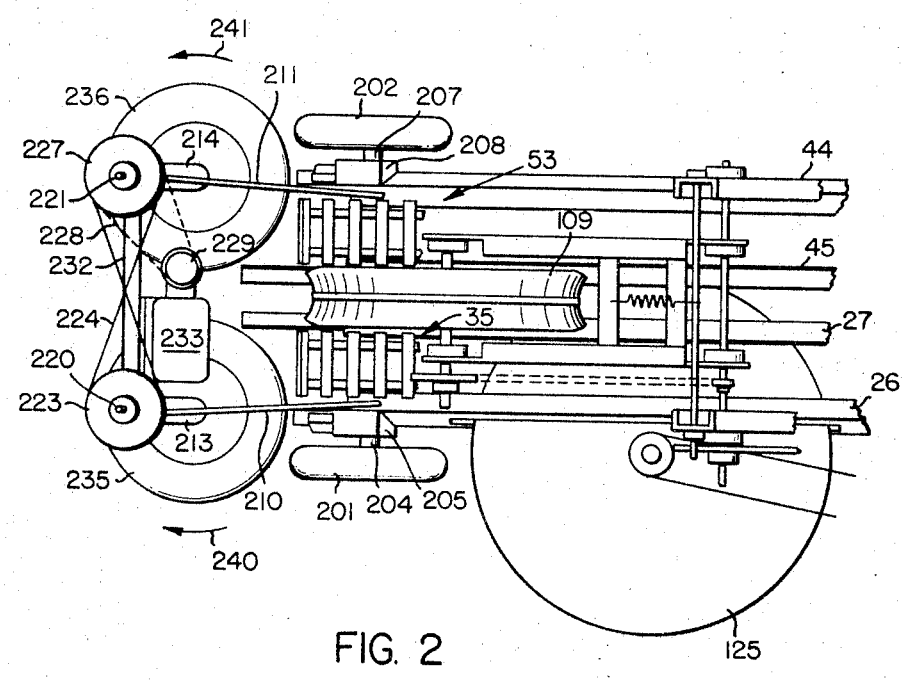
FIG. 2 is a fragmentary plan view of the front end of this machine.
Figure 4:
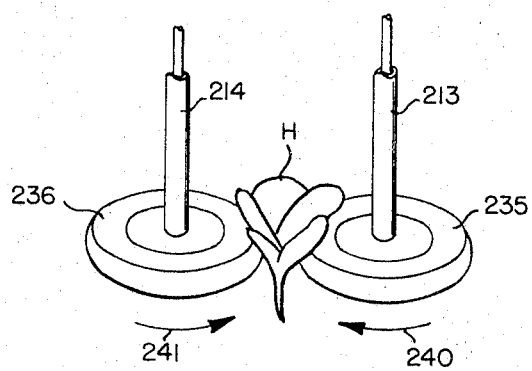
FIG. 4 is a fragmentary front elevational view further illustrating the operation of the means for uprooting the cabbages.

In operation the motor 233 drives the tires 235 and 236 through chain 228, belt 224 and shafts 220, 221 in the directions indicated by arrows 240 and 241 in FIG. 2. As the machine 11 is drawn by a tractor or the like along a row of cabbage plants, the rotating tires 235 and 236 which are inclined slightly to the horizontal (FIG. 1), burrow into the ground under the heads of the plants at opposite sides of the plants as the machine 11 advances, and uproot the plants, and transport them upwardly and rearwardly into the space between the conveyor belts 35 and 53, where they are engaged with the heads H resting on the belts and the stalks S extending downwardly into the space between the belts. The upper reaches of the belts 35 and 53, which move rearwardly, as disclosed in Patent No. 3,194,318, thereby convey the heads rearwardly beneath a rotating wheel 109, which presses each head H slightly downwardly to to insure that its stalk S will engage a rotating disk cutter 125, which extends transversely across the space between the belts 35 and 53 beneath the wheel 109. The severed stalks then drop to the ground between the belts 35 and 53, while the trimmed cabbage heads, together with the outer leaves, which are released from the cabbage head upon severing of the stem are transported upwardly and rearwardly for separation of the trimmed cabbage heads from the loose leaves as described in Patent No. 3,194,318.

From the foregoing it will be apparent that applicant has devised a relatively simple, yet positive means for uprooting cabbage heads and transferring them rearwardly onto the forward ends of the conveyor belts 35 and 53. The tires 235 and 236 may be inflated to any desirable pressure, which will insure the uprooting of the cabbages without causing any undue crushing, or bruising of the heads. The wheels 201 and 202 support the forward ends of the two, elongate, rigid frames defined by the two pairs of channel irons 26, 27 and 44, 45, respectively, above the surface of the ground so that the forward ends of these frames or channels do not dig into the ground, or otherwise unnecessarily impede the advance of the machine along a row of cabbages. Moreover, because their surfaces are resilient, the rotating tires 235 and 236 do not tend to pick up rocks, which may be in the path of the advancing machine 11, and which would tend to damage the belts 35 and 53, or the cutter 125, were they to be picked up and advanced rearwardly onto the conveyors.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A machine for harvesting cabbage, comprising:
   a wheeled carriage adapted to straddle a row of cabbage and to be advanced on the ground over the row,
   an elongate, rigid frame mounted on said carriage and inclined downwardly from rear to front of the carriage,
   a pair of spaced sleeves rigidly secured to said frame forwardly thereof with their axes disposed in a common plane which is inclined to the vertical and which extends transversely of said frame,
   a shaft journaled in each sleeve to rotate coaxially thereof,
   each shaft having a pneumatic-tired wheel secured to it at its lower end, below the forward end of the frame to extend forwardly beyond the frame,
   said wheels being coplanar and spaced from one another to engage under the heads of cabbages at opposite sides thereof as the carriage is advanced over the row,
   means for rotating said shafts in opposite directions simultaneously during advance of the carriage, whereby said wheels uproot the cabbage plants in the row, and
   conveying means mounted on said frame rearwardly of said wheels for receiving the plants uprooted by said wheels and for conveying the uprooted plants rearwardly of the carriage.

2. A machine for harvesting cabbage, comprising:
   a wheeled carriage adapted to straddle a row of cabbage and be advanced on the ground over the row,
   an elongate, rigid frame mounted on said carriage and inclined downwardly from rear to front of the carriage,
   a pair of spaced sleeves rigidly secured to said frame forwardly thereof with their axes disposed in a common plane which is inclined to the vertical and which extends transversely of said frame,
   a shaft journaled in each of said sleeves to rotate coaxially thereof,
   each shaft having a pneumatic-tired wheel secured to it at its lower end,
   the two wheels being mounted at, but below, the forward end of the frame, and being coplanar so that they rotate in a common plane about parallel axes inclined to the horizontal to engage under the heads of cabbages at opposite sides thereof as the carriage is advanced over the row,
   a motor mounted between said sleeves and connected to said shaft to drive said shaft in opposite directions simultaneously during advance of the carriage, whereby said wheels uproot the cabbage plants in the row, and
   conveying means mounted on said frame rearwardly of said wheels for receiving the plants uprooted by said wheels and for conveying the uprooted plants rearwardly of the carriage,
   said conveying means comprising a pair of parallel, endless belts mounted on said frame to travel upwardly from front to rear and so that their upper reaches lie in planes that converge downwardly toward one another, said belts being spaced so that the stalks of the cabbage plants will depend in the space between the belts as the cabbages are conveyed by the belts rearwardly of the carriage, and
   cutting means mounted on the carriage below the belts to extend across the space between the belts to engage and sever the stalks of the plants from the heads thereof as the plants are conveyed rearwardly by the belts.

References Cited

UNITED STATES PATENTS

| 2,648,185 | 8/1953 | Dohlman | 171—58 |
| 2,660,013 | 11/1953 | Priestley | 171—58 |
| 2,924,283 | 2/1960 | MacPhee | 171—58 |
| 3,194,318 | 7/1965 | Boyer. | |

ABRAHAM G. STONE, Primary Examiner.

P. A. RAZZANO, Assistant Examiner.

U.S. Cl. X.R.

171—58